FACSIMILE APPARATUS

Filed June 17, 1955 2 Sheets-Sheet 1

INVENTOR.
JOHN W. SMITH
BY J. B. Burke
ATTORNEY

INVENTOR.
JOHN W. SMITH
BY J. B. Burke
ATTORNEY

United States Patent Office 2,835,733

Patented May 20, 1958

2,835,733

FACSIMILE APPARATUS

John W. Smith, Whitestone, N. Y., assignor to Faximile, Inc., New York, N. Y., a corporation of Delaware Application June 17, 1955, Serial No. 516,296

6 Claims. (Cl. 178—69.5)

This invention concerns facsimile communications apparatus and particularly a novel control system usable in such apparatus.

In one successful facsimile communications system a device is provided for scanning graphic copy line by line by suitable optical means. Light reflected from the copy or transmitted through the copy is focused on a photocell or phototube which generates electrical signals corresponding to the intensity of light cast on the phototube. These electrical signals are then transmitted to a receiver apparatus by radio or wire. The receiving apparatus feeds the electrical signals to a recording device wherein a sheet of electrosensitive recording paper is continuously drawn between linear and helical electrodes having a point of intersection which moves in one direction across the paper to trace succeeding lines thereon. The fluctuating current flows continuously through the paper and line by line reproduces the graphic copy. In such a system it is essential that the scanning and recording devices be synchronized so that the starting and ending of recording of each line be exactly in phase with the beginning and ending of scanning of each line of graphic copy. It is essential that this synchronization or phasing of scanner with recorder be accomplished before actual transmission of graphic copy signals begins to prevent loss or distortion of copy signals due to lack of proper phasing during transmission. It is therefore a principal object of the invention to provide a facsimile apparatus with a phasing facility of having a control means for automatically initiating a phasing operation when signal transmission begins. It is a further object to provide a facsimile phasing facility with a control means for automatically continuing a phasing operation for a predetermined time interval. It is a further object to provide facsimile apparatus with control means for preventing transmission of facsimile copy signals until a phasing operation is completed. It is a further object to provide a phasing facility for a facsimile apparatus with means for alerting the phasing facility during signal transmission so that if signal transmission is interrupted even momentarily the phasing operation will automatically begin. It is a further object to provide control means for operating a facsimile apparatus for a predetermined time interval after signal transmission ceases.

It is another object of this invention to provide means in a facsimile apparatus for insuring that all recorded copy will be drawn away from recording electrodes after recording of graphic copy ceases. This important feature of the invention is particularly applicable to facsimile recorders of the type disclosed in Hogan Patent 2,575,959.

It is a further object to provide means under manual or automatic control in a facsimile apparatus for shifting the phase of a synchronous recorder motor one step or pole at a time.

It is a further object to provide a facsimile system in which a pilot signal is transmitted along with phasing signals and with graphic copy signals to control operation of a recording device.

Other and further objects and advantages of the invention will become apparent from the following description taken together with the drawing wherein.

Figures 1, 1A:
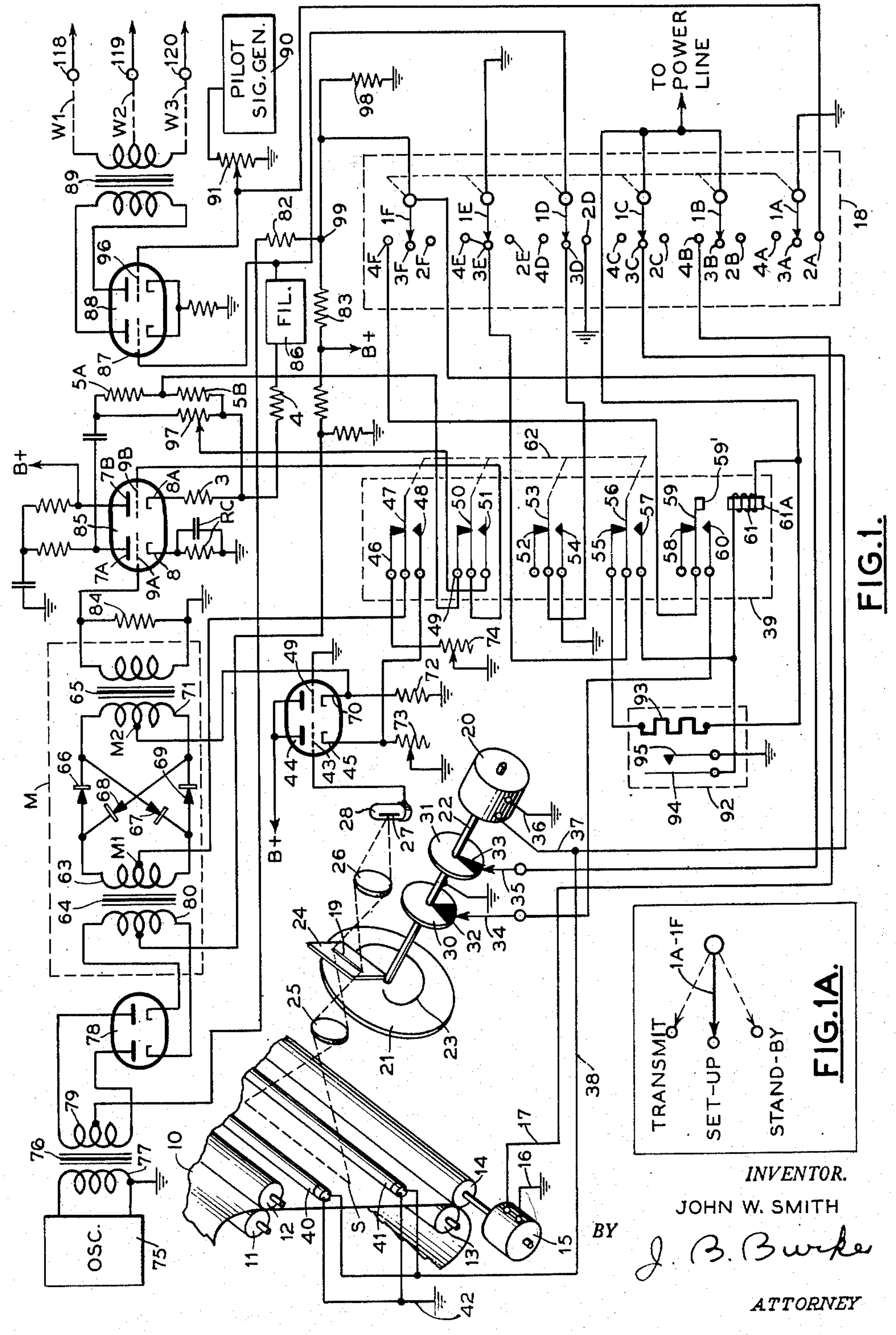
Fig. 1 is a schematic drawing of a facsimile scanner-transmitter apparatus.
Fig. 1A shows various operations of a principal control switch used in the apparatus.

In Fig. 1 a sheet 10 marked with graphic copy is drawn between pairs of rollers 11, 12 and 13, 14. Roller 14 is driven by a motor 15. The motor is energized via wires 16, 17. Wire 16 is connected to the ground return of a suitable source of power. Wire 17 terminates at contact 4B of the six section gang switch 18. This switch has its movable contacts 1A to 1F connected together. The switch is manually settable to three positions designated "standby," "set-up," and "transmit" as shown in Fig. 1A. The switch has stationary contacts 2A—2F, 3A—3F and 4A—4F located respectively at the three switch positions.

A synchronous motor 20 is provided to rotate an opaque scanning disk 21 mounted on shaft 22. The disk has a spiral slit 23 which extends around the shaft about 315 degrees. The spiral slit intersects with a straight slit 19 in a stationary opaque film or plate 24. Thus during seven-eighths of each rotation of the disk a transparent scanning aperture is defined by the intersecting slits. For one-eighth of each rotation the scanning aperture is blacked out. A pair of lenses 25, 26 are disposed at opposite sides of the scanning aperture. Lens 25 focuses a scanned line S of the copy sheet upon the straight slit 19 and lens 26 focuses the straight slit on the cathode 27 of phototube 28. The phototube produces a voltage output which is a function of the light falling on the cathode. This voltage output is applied to a circuit described in detail below. Shaft 22 also carries two disks 30, 31. These disks are made of non-conductive material such as fiber or plastic and include conductive segments. Disk 30 has a conductive segment 32 of about 45 degrees. Disk 31 has a small conductive segment 33 of not more than 15 degrees. The segments extend to shaft 22 which is grounded. Contacts 34 and 35 ride over the perimeters of the respective disks 30, 31 as they rotate. The conductive segments are so located on the shaft 22 that contact is made only during the one-eighth of each cycle of disk 21 when no scanning aperture is defined through slit 19 by the slit in disk 21. Motor 20 is energized via wires 36, 37. Wire 36 is connected to the ground return of a suitable power source. Wire 37 terminates at contact 3C of switch 18. Another wire 38 is joined to wire 37 and terminates at the tubular lamps 40, 41. These lamps serve to illuminate the scanning line S on the copy sheet.

The phototube 28 may be a photomultiplier tube arranged to produce a logarithmic output as more fully disclosed in patent to Hester 2,582,831. The phototube output voltage represents a facsimile copy signal which is to be transmitted to a distant receiver station for recording as will be explained in connection with Fig. 2.

The phototube output is connected to grid 43 of a dual triode tube 44. This tube is arranged as a cathode follower amplifier. Cathode 45 is connected to contact 48 of a quick acting relay 39. This relay has five movable contacts 47, 50, 53, 56, 59 in a gang connection 62. Relay coil 61 is wound on core 61A and actuates armature 59'. When the relay coil 61 is energized contact pairs 47—48, 50—51, 53—54, 56—57 and 59—60 are closed.

When the relay coil is not energized only contact pairs 46—47, 49—50, 52—53 are closed. Movable contact 47 is connected to center tap M1 of transformer winding 63. This center tap is one signal input of a ring modulator circuit M including transformers 64, 65 and rectifiers 66—69 connected in a ring circuit. This ring circuit is similar to that described in patent to Ressler 2,313,583. Cathode 70 of tube 44 is connected to the center tap input M2 of transformer winding 71. The cathodes of the tube are grounded via resistors 72, 73. When the relay is deenergized, the center tap M1, which is one input terminal of the modulator, is returned to ground through variable resistor 74 and contacts 46—47. The resistor 74 is used to control the output level of the ring modulator when a steady carrier input is obtained from the modulator. An oscillator 75 of the conventional type generates a steady carrier signal which is applied to winding 77 of transformer 76. A dual diode 78 has its plates connected to winding 79 of the transformer 76 and its cathodes connected to winding 80 of transformer 64. The center taps of windings 79 and 80 are connected to the junction point 99 of resistors 82, 83. Resistor 84 is connected across the secondary winding of transformer 65. The combined output of signals applied to the ring modulator M appears across resistor 84 and is then applied to amplifier tube 85. This tube is a dual triode. The first section includes grid 9A, cathode 8 and plate 7A. Grid 9A is connected to resistor 84. The second section of tube 85 includes grid 9B, cathode 8A and plate 7B arranged as a cathode follower driven by the first section of the tube. One input to grid 9B is taken from the junction of fixed resistors 5A and 5B via contacts 49 and 50 of relay 39. Another input is taken via variable resistor 97 and relay contacts 50—51. Resistors 5A, 5B and 97 are in the signal output circuit of plate 7A. When the relay 39 is deenergized the contacts 49—50 are closed and the level of the phasing signal is independent of the setting of resistor 97. When relay 39 is energized contacts 49—50 are open and contacts 50—51 are closed. Variable resistor 97 now controls the maximum black (or white) signal level applied to grid 9B. The output of the cathode follower section of tube 85 is taken from the junction of resistor 3 with resistors 5B and 97. The cathode follower output is applied to filter 86 which may be a vestigial sideband filter for substantially removing one sideband of the double sideband signal originating in the modulator. The output of the filter is applied to grid 87 of the dual triode amplifier 88. The plates of this tube are connected to the primary winding of an output transformer 89. The secondary winding of the transformer is connected to transmission lines W1, W2, W3 which terminate at terminals 118, 119, 120. These terminals correspond to the same numbered input terminals of the receiver-recorder circuit shown in Fig. 2. Thus Figs. 1 and 2 may be considered as constituting a single facsimile communications system. The transmission lines W1, W2, W3 may be arranged in either a wire or radio link to connect the scanning and transmission apparatus of Fig. 1 with the receiving and recording apparatus of Fig. 2.

Figure 2:
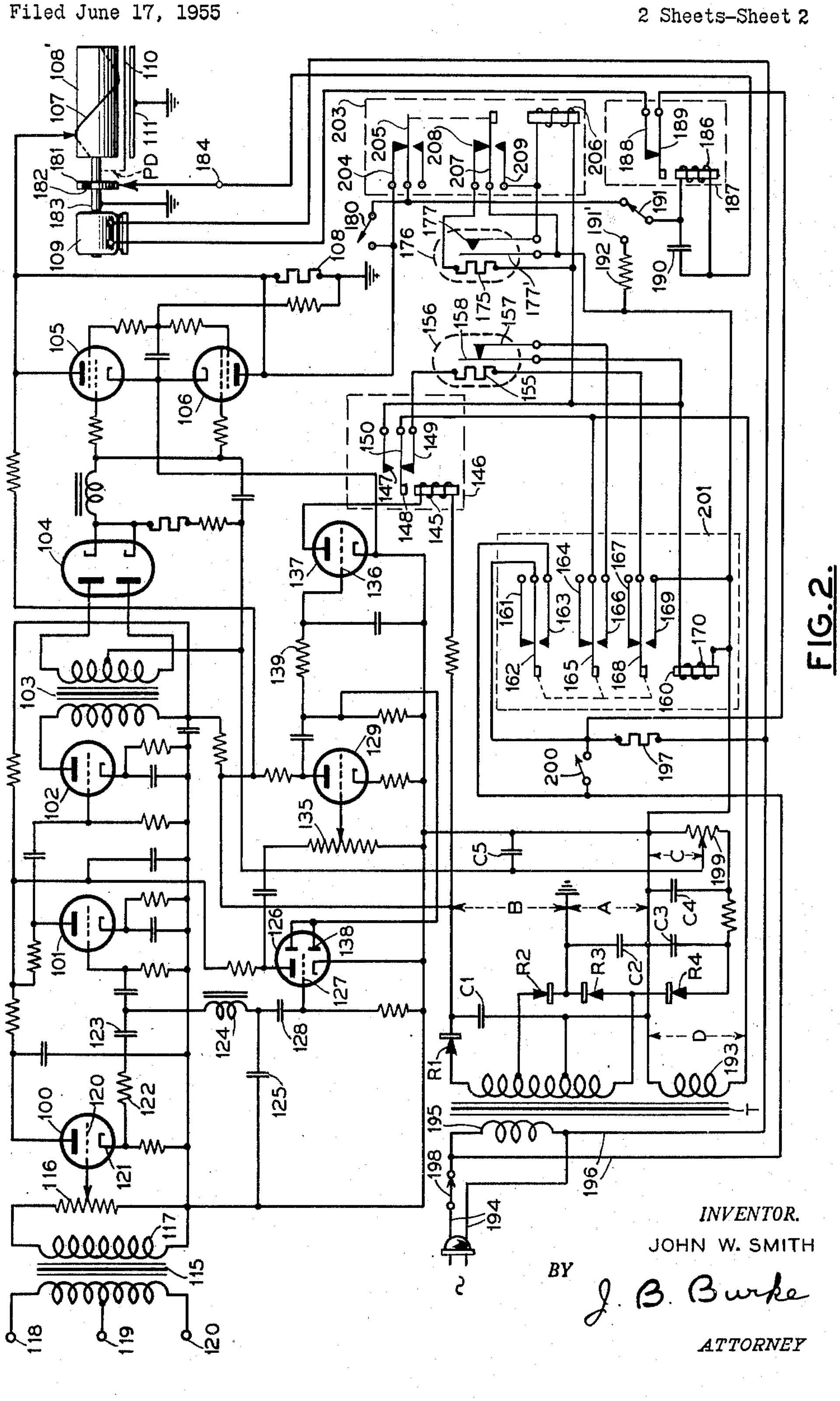
Fig. 2 is a schematic drawing of a receiver-recorder apparatus which may be used with the apparatus of Fig. 1.

A signal generator 90 is provided for generating a pilot signal which is utilized in the receiving system of Fig. 2 for control purposes. This signal is applied to grid 96 of amplifier tube 88 via variable resistor 91. A thermal delay relay 92 is employed in the system for control purposes. This is a known type of relay which includes a resistive heater element 93 and two contact elements 94, 95. When the heater element 93 is deenergized the contacts 94—95 are open. When current is passed through the heater element, the contacts will close only after the relay reaches a certain temperature which will take a predetermined interval of time. The contacts 94, 95 will remain closed as long as the relay remains at or above the predetermined temperature. Contact 94 is connected to relay contact 57 and to one end of relay coil 61. Contact 95 is grounded. Element 93 is connected to contact 55 of relay 39.

The control system included in the transmission apparatus shown in Fig. 1 is operated by the manual setting of switch 18. When the switch is in "stand-by" position, relays 39 and 92 are both deenergized. The power supply circuit for heater element 93 is open at contact 2E and the power supply circuit for coil 61 is open at contact 58. In the "stand-by" position, the heaters of the several tubes used in the apparatus are energized by conventional means and the apparatus is ready to transmit graphic copy signals, phasing signals and pilot tone signals. No graphic copy or picture signals are produced at "stand-by" because disk 21 is not rotating. The oscillator 75 applies a steady unmodulated carrier signal via the transformer 76 and normally conducting diodes 78 to the ring modulator M. This carrier signal then passes via amplifier 85, filter 86 to amplifier 88. At grid 87 the signal is stopped because this grid is grounded via contacts 1D—2D with the switch in "stand-by" position. The pilot signal from generator 90 applied to grid 96 is also stopped since it is grounded via contacts 1A—2A.

Upon setting switch 18 to the "set-up" position which is the one shown in Fig. 1, power is supplied from a suitable power source to energize lamps 40, 41 and motor 20 via contacts 1C—3C and wires 38, 42. The rotation of shaft 22 causes the phasing disk 31 to ground periodically the junction point 99 of resistors 82, 83, 98. Diodes 78 which are normally conducting are rendered non-conducting by a reversal in applied voltage each time point 99 is grounded. This causes a periodic interruption of the carrier signal applied to grid 87 of tube 88. The ground connection is removed from this grid as well as from grid 96, when contacts 1D and 1A move to 3D and 3A respectively. Thus the periodically interrupted carrier is amplified in tube 88 and transmitted via transformer 89 to the receiving and recording apparatus. In this apparatus the maximum amplitude of carrier periodically interrupted is the phasing signal used to perform the phasing operation. At the recording apparatus the recording motor 109 is brought into phase with motor 20 so that disc 21 and the electrode 107 shown in Fig. 2 rotate in synchronism. The pilot signal applied to grid 96 is mixed with the carrier signal and is transmitted with it via lines W1–W3 to the receiving and recording apparatus to perform circuit control functions to be described in connection with Fig. 2. The phasing signal will be transmitted for only a predetermined phasing time interval equal to the operating delay time of relay 92.

When switch 18 is moved to "set-up," heater element 93 begins to heat since its power supply circuit is closed through contacts 55—56 and 1E–3E. After the relay heats sufficiently contacts 94, 95 close which causes relay 39 to be energized. When the relay coil 61 is energized magnet 61A pulls down armature 59′ and the movable contacts. The opening of contacts 55—56 breaks the power supply circuit to heater element 93; the relay 92 begins to cool off, and contacts 94—95 open. The power supply to coil 61 is maintained through closed contacts 56—57 so that relay 39 in effect seals itself and remains energized as long as the switch 18 is in "set-up" or "transmit" position. Contacts 47—48 close when the relay 39 is energized so that the picture signal which was blocked by open contact 48 can now be applied from cathode 45 to the winding 63 of the ring modulator via contacts 51—52. The grid 87 becomes grounded via contacts 53—54 when the relay 39 is energized at the end of the phasing signal period so that transmission of the phasing signal ceases if switch 18 is not by then set to "transmit."

During transmission of the phasing signal in both "set-up" and "transmit" operation contacts 59—60 are open so that no blanking of the signal can take place by grounding of junction point 99 via conductive segment 32 on disk 30. After the close of the phasing interval relay 39 is energized so that contacts 59—60 close. This causes a 45 degree blanking period to occur at the end of transmission of each line of copy provided that contacts 1F–4F are closed for "transmit" operation. During this blanking period no signals can be recorded. Thus between the end of one line of recording and the beginning of the next line (the "backstroke" period) any spurious signals which may occur are effectively blocked and cannot be recorded. This blanking period occurs cyclically during each revolution of the helical electrode only in "transmit" operation. It cannot occur in "set-up" operation after the phasing interval because switch contacts 1F—4F are open.

When switch 18 is set to "transmit" from "set-up" the short circuit to ground is removed from grid 87 and picture signals modulated on the carrier wave can be transmitted via amplifier 88 and transformer 89. The contacts 1B–4B are closed only in the "transmit" position which completes the power supply circuit for motor 15 so that the sheet 10 may advance as the copy is scanned line by line.

If the switch 18 were set to "transmit" directly from "stand-by," the copy signals could not be transmitted until the end of the phasing interval. This occurs because the copy signals cannot pass contact 48 until the relay 39 is energized and this relay will not be energized until the end of the operating delay time of relay 92 as above explained. Thus at both the beginning of "set-up" and "transmit" circuit conditions the phasing of the recorder with the scanner must be accomplished before copy signals can be transmitted.

In "stand-by" operation no signals are transmitted to the external lines W1–W3 because relay 39 remains deenergized. The input terminal M1 of the ring modulator is returned to ground through resistor 74 and contacts 46—47. Meanwhile under these conditions diode keyer 78 is conducting and a steady unmodulated carrier signal is obtained from the modulator and applied to amplifier 85. The carrier signal level at the modulator is controlled by the setting of resistor 74.

In "set-up" operation the heater element 93 of the thermal delay relay 92 is energized. Short circuits to ground previously existing for grids 87 and 96 are removed. Signals originating in the modulator can then pass to the output lines W1–W3. The scanning drive motor 20 and lamps 40, 41 are energized in "set-up" operation. The phasing signal and blanking signal commutator disks 31 and 30 are rotated and the phasing disk segment 33 grounds the junction 99 for not more than one twenty-fourth of the scanning line S or a maximum of 15 degrees of each rotation of disk 21. Each time junction 99 is grounded a reverse potential blocks diode keyer 78 so that no carrier signal reaches the modulator primary winding 80 and no output signal is obtained at lines W1—W3. Thus a full level carrier signal is obtained for at least twenty-three twenty-fourths of the scanning line S or about 345 degrees of rotation of scanning disk 21.

When the operating delay time of relay 97 has expired, relay 39 is energized and seals itself through its contacts to a power source until the apparatus is returned to "stand-by" operation. When relay 30 is energized thermal delay relay 92 is deenergized and allowed to cool and be prepared for another cycle of operation. When relay 39 becomes energized, circuit conditions are prepared for picture signal transmission, except that output is blocked by the short circuit to ground of grid 87. This short circuit is removed when "transmit" operation occurs.

In operation of the apparatus of Fig. 1 under normal copy transmission conditions, herein designated "transmit" operation, reflected light from copy 10 is projected on photocathode 27. The output of the phototube 28 appears as a D. C. signal which is applied to grid 43 of one cathode follower section of the tube 44. The output of this section is applied to the center tap M1 of winding 63 of the diode ring modulator M via contacts 47—48. The center tap M2 of winding 71 is connected to cathode 70 in the other cathode follower section which has a grounded control grid 49. This section provides a stable balancing potential for the first section which acts as a picture signal amplifier.

The oscillator 75 applies a carrier which may be of the order of 2400 to 6500 cycles per second. A higher or lower carrier frequency may be used depending on the speed of line scanning. The output of the ring modulator M appears across resistor 84. This output consists of the carrier amplitude modulated by the picture frequency signals originating in phototube 28. The signals are amplified in amplifier 85 and applied to filter 86 which removes the major portion of the one sideband preferably the upper sideband of the double sideband signal originating in the modulator. The output of the filter is applied to grid 87 and after amplification the picture signals are applied to transformer 89 mixed with the steady pilot signal applied from generator 90. The pilot signal frequency should be substantially lower than the lowest sideband of the modulated carrier. For a carrier ranging from 2400 to 6500 cycles per second, a pilot frequency of about 450 cycles per second might be used.

To summarize the several operational steps in the transmitter apparatus, no output signal is obtained in "stand-by" operation. In "set-up" and "transmit" operation a continuous pilot signal is applied to grid 96 of tube 88 where the pilot signal is impressed on the interconnected cathodes. Thus the output signal obtained from transformer 89 is a composite of the modulated carrier and pilot signal. For the operating delay period (generally about 30 seconds or so) of relay 92 phasing signals are obtained in "set-up" and "transmit" operation. After the phasing interval in "transmit" operation copy signals may be transmitted to the receiver-recorder apparatus. If a radio link is used in transmission paths W1–W3, then the composite modulated carried (or subcarrier) and pilot signal will be AM or FM modulated on a radio frequency carrier in conventional manner. At the receiver-recorder station the modulated AM or FM carrier will be demodulated in conventional manner to produce at terminals 118–120 the composite modulated subcarrier and pilot signal. It is also possible to apply the picture signals so as to frequency modulate the carrier signal produced by oscillator 75 instead of amplitude modulating this carrier as explained in connection with Fig. 1. For frequency modulation of the subcarrier ring modulator M may be replaced by a reactance modulator tube or other FM modulator, such as disclosed for example in Armstrong Patents 1,941,068 and 2,104,012.

In Fig. 2 is shown schematically facsimile receiving and recording apparatus to which signals are transmitted from a transmitter apparatus such as shown in Fig. 1. The receiving and recording apparatus includes a preamplifier tube 100 which is connected as a cathode follower to amplifier tube 101. Amplifier tube 101 drives amplifier tube 102. This amplifier tube is coupled via transformer 103 and diodes 104 to the tetrode amplifiers 105, 106. A rotatable helical electrode 107 is mounted on drum 108' which is rotated by a synchronous motor 109. The helical electrode is electrically in circuit with the plates of tubes 105, 106 and linear electrode 111 is grounded so that a D. C. potential is applied to the helical and linear electrodes. The helical electrode extends about 315 degrees around the drum so that for 45 degrees during each rotation, the helical electrode is out of contact with the linear electrode through the recording paper 110. A thyrite or non-linear resistor 108 is connected to the output of tetrodes 105, 106 and serves to provide a load for the tetrodes when the helical electrode is out of contact with the stationary linear electrode 111. A suitable paper feed means is used to advance the paper 110 during recording. This paper feed means may be geared to motor 109 as indicated by dotted line PD.

A transformer 115 is provided at the input of the receiving apparatus. Variable resistor 116 is connected across a secondary winding 117. The received signals are applied to primary winding terminals 118, 119, 120 and are then applied to the grid 120 of tube 100 from resistor 116. A low pass filter circuit is connected to the cathode 121 via resistor 122 and capacitor 123 for passing the pilot signal. This filter includes the inductance choke coil 124 and capacitor 125. A diode-triode 126 has its input grid 127 connected to the filter circuit via capacitor 128. The output of the triode section is connected to the grid of an amplifier triode 129 via a bias control resistor 135. The plate output circuit of triode 129 is connected to the grid 136 of tube 137. Diode plates 138 of tube 126 are connected to grid 136 in series with resistor 139.

Coil 145 of a quick acting relay 146 is in series with the plate of tube 137. An armature 148 controls movement of switch contact 150. Contact 150 is normally closed with contact 147 but when coil 145 is energized contacts 149 and 150 are closed and contacts 147, 150 are open as shown in the drawing.

Contact 149 is connected to heater element 155 in a thermal delay relay 156. Contacts 157, 158 are normally closed but are opened when heater element 155 is heated by current passing through it. Contact 158 is connected to heater element 175 in thermal delay relay 176. This relay contacts 177—177′ which are normally open but are normally open but are closed when element 175 is heated. A quick acting relay 201 has one end of its coil 170 connected to contact 147. The other end of the coil is connected to power supply D. Coil 170 is wound on core 160. Relay 201 has three sets of switch contacts. Movable contacts 162, 165, 168 are mechanically joined together to move when coil 170 is energized. When the coil is not energized contact pairs 161—162, 164—165, 167—168 are closed. When the relay coil is energized contact pairs 162—163, 165—166, 168—169 are closed and the first mentioned contact pairs are open. Another quick acting relay 203 has one end of its coil 206 connected to heater contact 147 and element 175, and the other end connected to contacts 177 and 209. Movable contact 205 is connected to relay coil 186 via switch 191. Movable contact 207 is connected to contact 177′ and to one side of the power source D. Stationary contact 204 is connected to the plates of tubes 105, 106. A normally open switch 180 is provided to short circuit contacts 204—205 when the motor 109 is manually phased. Stationary contact 208 is connected to heater element 175. Relay 203 is used to provide immediate reactivation of the phasing facility in the event of pilot signal loss.

The phasing facility includes relays 146, 176, 187, 201 and 203. The phasing facility includes in part a phasing circuit which may be operated automatically in one configuration and manually in another configuration. The phasing circuit includes a circular disk 181 made of nonconductive material and having a conductive segment 182 occupying one half or less of angular distance occupied by segment 33 on disk 31 shown in Fig. 1. The disk 181 is mounted on shaft 183 of motor 109 and rotates with helical electrode 107 and drum 108′. The shaft 183 is electrically grounded. A contact element 184 rides on the disk 181 to contact the conductive segment during a portion of each rotation of the disk. The conductive segment 182 is so located that it is in contact with element 184 during the phasing period which occurs when the helical electrode is out of contact with the linear electrode through the recording paper. Contact element 184 is connected to coil 186 of a relay 187. A pair of normally closed contacts 188—189 are opened when coil 186 is energized. A capacitor 190 is connected to coil 186 which serves to delay the deenergizing of the relay. Transformer T is provided with rectifiers R1, R2, R3 and R4 and filter capacitors C1, C2, C3, C4, C5 to furnish full wave rectified power supplies A, B, and C. An A. C. voltage D is obtained from winding 193. A. C. power is supplied to transformer T through power lines 194 connected to primary 195. Power lines 196 are connected from lines 194 to a heater element 197 and motor 109. Switch 198 controls the supply of power to the transformer. The power supply C is derived from the bleeder resistor 199.

The apparatus of Fig. 2 is operated in either "stand-by" or signal receiving conditions. All operations during signal receiving take place automatically when pilot signals combined with phasing or graphic copy signals are received by the apparatus. In "stand-by" operation the receiving apparatus is ready to receive signals from the transmitter. In Fig. 2 the apparatus is shown in "stand-by" condition. Switch 198 has been closed to energize transformer T. The heaters (not shown) of all tubes are being heated by a suitable power source. Tube 137 is conducting a current in this condition and relay coil 145 is energized. Thus contacts 149—150 of relay 146 are closed. The heater 175 of relay 176 is deenergized because contacts 147—150 are open. Relays 156 and 201 are deenergized so that contact pairs 157—158, 161—162, 164—165 and 167—168 are closed. Drum 108 and disk 181 are stationary since the power supply circuit of motor 109 is open at contact 161. Contacts 188—189 of relay 187 are closed since relay coil 186 is deenergized in the absence of signals received from the transmitter.

When the transmitter apparatus is switched to "set-up" or "transmit" operation combined phasing and pilot signals arrive for about thirty seconds or so which is the predetermined duration of the phasing interval. These signals are applied to transformer 115 via terminals 118-120. After passing resistor 116 and amplifier 100, the low frequency pilot signal components are filtered out via inductor 124 and capacitor 125 and are applied via capacitor 128 to the grid 127 of the triode section of tube 126. The pilot signals are amplified in tubes 126 and 129 so that the diode section 138 of tube 126 conducts and applies a negative voltage to grid 136 to cut off tube 137. Relay 146 becomes deenergized and contacts 149—150 open while contacts 147 and 150 close so that current from source D is then applied to heater element 175 via closed contacts 207—208 and relay coil 170 to actuate the relay 201. The current energizing heater element 175 continues until contacts 177—177′ close or relay 146 becomes energized by cessation of the pilot signal. When contacts 177—177′ close at the end of the phasing interval relay coil 206 becomes energized via closed contacts 147—150 from power source D. This opens contacts 207—208 to deenergize the heater element 175. It generally requires a predetermined time slightly longer than the phasing interval for the relay 176 to heat sufficiently so that contacts 177—177′ may close. While these contacts are still open phasing signals are being passed through amplifiers 101 and 102, diodes 104 and amplifiers 105, 106. Also motor 109 is running because contacts 162—163 have closed at the start of the phasing interval. The disk 181 is rotating and the segment 182 with contact 184 periodically completes a circuit through relay coil 186, closed contacts 204—205 and the plates of tubes 105, 106. Each time this phasing circuit is completed contacts 188—189 open to interrupt the power supply circuit of motor 109. This momentary interruption permits slipping of one pole or so in the motor 109, and is repeated until motor 109 is exactly in phase with motor 20 at the transmitter. When the two motors are in phase, no phasing signal appears at the outputs of 105, 106 during the 15 degrees phasing period so that relay 187 is not energized and the motor 109 rotates continuously. When the recorder motor 109 is properly phased with respect to the scanner motor 20 the recording of each line will be properly centered in the recording paper 110. Phasing of the recorder motor will be completed by the end of phasing interval when contacts 177—177′ close because thermal delay relay 176 has heated sufficiently. At the end of the phasing interval heater element 175 begins to cool off because contacts 207—208 open. Contacts 177—177' open as the heater element 175 cools but the power supply energizing coil 206 is not interrupted because relay 203 in effect seals itself. Since contacts 207, 209 close at the end of the phasing interval, current is then supplied to coil 206 through contacts 207, 209 and 147, 150 from power source D. Power source D may be any suitable power supply such as indicated in the drawing.

The transmitter stops sending phasing signals at the end of the phasing period and the recorder's phasing circuit is then deactivated by relay 176 as above explained. If graphic copy signals modulated on a carrier are received from the transmitter they will be applied to amplifier tube 101. Amplifier tubes 101 and 102 will amplify these copy signals. Transformer 103 passes the signals to demodulating rectifiers 104 and then to the tetrode amplifiers 105, 106 which are connected in a balanced circuit. The graphic copy signals will be then applied to electrodes 107, 111 to be recorded line by line on copy sheet 110. The non-linear resistor 108 connected to the plates of tetrodes 105, 106 is provided to furnish a suitable load impedance for the tetrodes when the recording circuit is broken between electrodes 107, 111 during the recurring 45 degrees blanking periods. As long as the copy signals arrive accompanied by the pilot signals relay 201 remains energized and the motor circuit through contacts 162—163 is unbroken.

When transmission of copy signals ceases it is desirable to permit the motor 109 and paper feed drive PD to continue operating for an overrun interval of a minute or two. During this time the recorded copy will move clear of the electrodes for convenient removal. If the graphic copy signals cease and if the pilot signals applied to grid 127 of tube 126 also cease, then diodes 138 stop conducting current and the tube 137 again begins to conduct as in "stand-by" operation. Relay 146 becomes energized and contacts 147, 150 open. It now only requires resumption of the pilot signals to deenergize relay 146 and close contacts 147, 150 to begin a new phasing interval by heating element 175. Coil 170 will remain energized after signal transmission ceases until the contacts 157—158 of relay 156 open. Contacts 157—158 open only after the heater element 155 heats sufficiently. During the time required for the element 155 to heat the motor 109 continues running. After the element 155 heats sufficiently contacts 157—158 open causing relay coil 170 to become deenergized. Relay 201 is thus deenergized and contacts 168—169 then open to deenergize the heater element 155 and contacts 157—158 close. When contacts 162—163 open at end of the overrun interval the "stand-by" condition is reestablished at the recorder with motor 109. If pilot signals should reappear during the heating period of thermal delay relay 156, relay 146 will again become deenergized to open the power supply circuit for element 155 and the phasing condition will be reestablished. If the cessation of copy signals was due to setting the transmitter back to "stand-by" or "set-up" operation rephasing of the motors automatically occurs before graphic copy signals can again be transmitted and recorded. The control system of the receiving and recording apparatus is thus provided with two time delay intervals both governed by reception of pilot control signals. One time delay interval is phasing interval controlled in duration by the thermal delay relay 176. The other time delay interval is the overrun time interval introduced when pilot signal transmission ceases and controlled in duration by thermal delay relay 156.

It will be noted that a heater element 197 is provided in parallel with motor 109. This heater element may serve the same function as set forth in patent to Tribble 2,485,678 for intensifying the mark produced on the recording paper. This heater element is energized at the same time as motor 109 in the manner above described. A normally open switch 200 is provided to short circuit contacts 162—163 if it should be desired to run motor 109 and heater element continuously for test and adjustment purposes. Also for test and adjustment purposes it may be desired to control the phasing of motor 109 manually. A switch 191 is provided in series with coil 186 and another switch 180 is connected across contacts 204—205 for this purpose. If switch contacts 191—191' are closed and switch 200 is also closed, relay coil 186 will be energized periodically via resistor 192, power source A, conductive segment 182 and contact 184 while the motor runs. Switch 180 should be closed to short circuit contacts 204—205 so that this manually controlled phasing may be continued as long as required and regardless of the condition of relay 206.

While the invention has been described in some detail by reference to specific circuits it will be understood that this has been done by way of illustration only and the invention is not limited thereto since many modifications are possible without departing from the invention as defined by the scope of the appended claims.

What is claimed and desired to protect by Letters Patent of the United States is:

1. A control system for facsimile apparatus, comprising in circuit: means for generating a pilot signal combined respectively with phasing signals and with facsimile signals representative of graphic copy, a thermal delay relay in circuit with said means and operative to prevent generation of said facsimile signals prior to generation of said phasing signals for a predetermined time interval, a quick acting relay having a coil in circuit with said thermal delay relay and arranged to be energized at the end of said time interval, said quick acting relay being operative to permit generation of said facsimile signals when said coil is energized, a synchronous motor controllable in phase by said phasing signals, a power supply circuit for said motor, means responsive to receipt of said pilot signal for initiating a period of cyclic interruption of said power supply circuit by the phasing signals, and means responsive to termination of said pilot signals for interrupting said circuit after a predetermined time interval.

2. A control system for facsimile apparatus, comprising in circuit: means for generating a pilot signal combined respectively with phasing signals and with facsimile signals representative of graphic copy, means for automatically preventing generation of said facsimile signals prior to generation of said phasing signals for a predetermined time interval, a synchronous motor controllable in phase by said phasing signals, a first power supply circuit for said motor, a first thermal delay relay responsive to receipt of said pilot signal for initiating a period of cyclic interruption of said power supply circuit by the phasing signals, and a second thermal delay relay responsive to termination of said pilot signal for interrupting said power supply circuit after a predetermined time interval, a second power supply circuit arranged to energize said thermal delay relays, and a pair of quick acting relays connected to said first and second thermal delay relays respectively and arranged to control the energizing thereof by said second power supply circuit.

3. A control system for facsimile apparatus comprising means for generating a pilot signal combined respectively with phasing signals and with facsimile signals representative of graphic copy, means for automatically preventing generation of said facsimile signals prior to generation of said phasing signals for a predetermined time interval, a synchronous motor controllable in phase by said phasing signals, a power supply circuit for said motor, a first thermal delay relay responsive to receipt of said pilot signal for initiating a period of cyclic interruption of said circuit by the phasing signals, a second thermal delay relay responsive to termination of said pilot signals for interrupting said power supply circuit after a predetermined time interval, a second power supply circuit arranged to energize said thermal delay relays, and a pair of quick acting relays connected to said first and second thermal delay relays respectively and arranged to control the energizing thereof by said second power supply, one of said quick acting relays being provided with a self-sealing means comprising fixed and movable contacts and a coil arranged to be energized by said second power supply circuit at the end of said time interval, said one relay being operative when energized to maintain said second thermal delay relay deenergized.

4. A control system for facsimile apparatus, comprising in circuit: a signal generator of pilot signals, means for generating facsimile signals representative of graphic copy, said means including a flat rotatable disk having a spiral slit disposed to intersect a stationary linear slit in a flat opaque member, means for moving a copy sheet in an optical path past the intersection of said slits, means for illuminating said sheet, and a photoelectric cell disposed at the end of the optical path including said intersecting slits; means for rotating in coordination with said disk for generating phasing signals, means combining said pilot signals, facsimile signals, and phasing signals, a thermal delay relay in circuit with the last named means, said relay being operative to prevent generation of said facsimile signals prior to generation of said phasing signals for a predetermined time interval, a quick acting relay having a coil in circuit with said thermal delay relay arranged to be energized at the end of said time interval, said quick acting relay being operative to permit generation of said facsimile signals when said coil is energized, a synchronous motor controllable in phase by said phasing signals, a power supply circuit for said motor, means responsive to receipt of said pilot signal for initiating a period of cyclic interruption of said power supply circuit by the phasing signals, and means responsive to termination of said pilot signals for interrupting said circuit after a predetermined time interval.

5. A control system for facsimile apparatus, comprising in circuit: means for generating a pilot signal combined respectively with phasing signals and with facsimile signals representative of graphic copy, a first thermal delay relay in circuit with said means and operative to prevent generation of said facsimile signals prior to generation of said phasing signals for a predetermined time interval, a first quick acting relay having a coil in circuit with said thermal delay relay and arranged to be energized at the end of said time interval, said quick acting relay being operative to permit generation of said facsimile signals when said coil is energized, a synchronous motor controllable in phase by said phasing signals, a first power supply circuit for said motor, a second thermal delay relay responsive to receipt of said pilot signal for initiating a period of cyclic interruption of said first power supply circuit by the phasing signals, and a third thermal delay relay responsive to termination of said pilot signal for interrupting said first power supply circuit after a predetermined time interval, a second power supply circuit arranged to energize said thermal delay relays, and a pair of quick acting relays connected to said first and second thermal delay relays respectively and arranged to control the energizing thereof by said second power supply circuit.

6. A control system for facsimile apparatus, comprising in circuit: means for generating a pilot signal combined respectively with phasing signals and with facsimile signals representative of graphic copy, a first thermal delay relay in circuit with said means and operative to prevent generation of said facsimile signals prior to generation of said phasing signals for a predetermined time interval, a first quick acting relay having a coil in circuit with said thermal delay relay and arranged to be energized at the end of said time interval, said quick acting relay being operative to permit generation of said facsimile signals when said coil is energized, said quick acting relay including a self-sealing means including fixed and movable contacts arranged to be closed so that said coil is in circuit with a supply source when said thermal delay relay is deenergized, a synchronous motor controllable in phase by said phasing signals, a first power supply circuit for said motor, a second thermal delay relay responsive to receipt of said pilot signal for initiating a period of cyclic interruption of said power supply circuit by the phasing signals, and a third thermal delay relay responsive to termination of said pilot signals for interrupting said power supply circuit after a predetermined time interval, a second power supply circuit arranged to energize said thermal delay relays, and a pair of quick acting relays connected to said second and third thermal delay relays respectively and arranged to control the energizing thereof by said second power supply circuit, one of said pair of quick acting relays being provided with a self sealing means comprising fixed and movable contacts and a coil arranged to be energized by said second power supply circuit at the end of said time interval, said one relay being operative when energized to maintain said third thermal delay relay deenergized.

References Cited in the file of this patent

UNITED STATES PATENTS

| | | |
|---|---|---|
| 2,249,435 | Potts | July 15, 1941 |
| 2,326,740 | Artzt | Aug. 17, 1943 |
| 2,483,449 | Wise | Oct. 4, 1949 |
| 2,685,612 | Lansil | Aug. 3, 1954 |